S. P. WHITCOMB.
DOMESTIC-OVEN.
No. 178,983. Patented June 20, 1876.
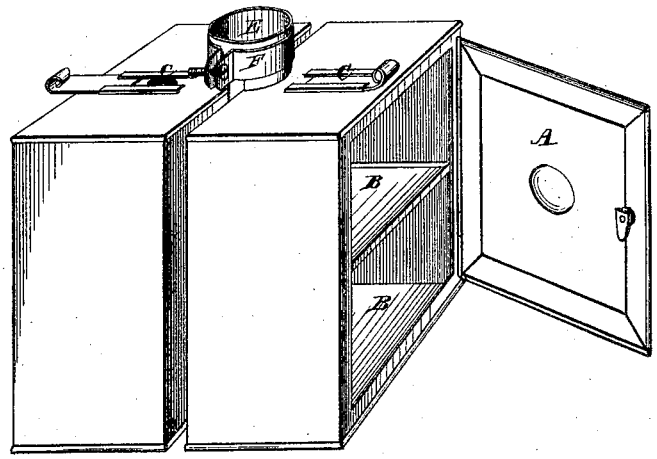
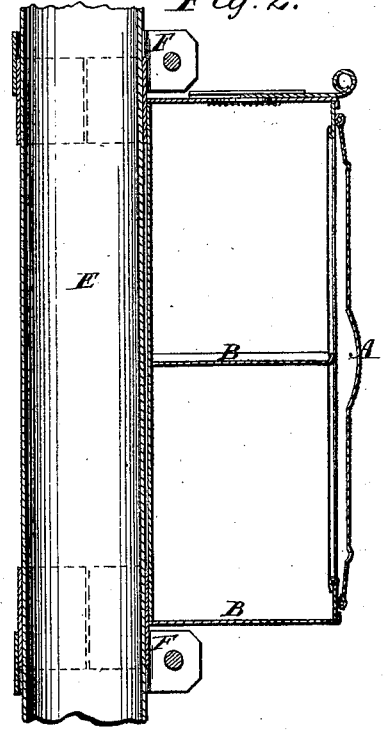

UNITED STATES PATENT OFFICE.

SIMEON P. WHITCOMB, OF HORNELLSVILLE, NEW YORK.

IMPROVEMENT IN DOMESTIC OVENS.

Specification forming part of Letters Patent No. 178,983, dated June 20, 1876; application filed May 13, 1876.

*To all whom it may concern:*

Be it known that I, SIMEON P. WHITCOMB, of Hornellsville, in the county of Steuben and State of New York, have invented certain new and useful Improvements in Warming or Drying Cupboard; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention consists in an improved device to be attached to the pipe of a stove for the purpose of warming food or drying fruit.

In the accompanying drawings, Figure 1 is a perspective view of my invention. Fig. 2 is a sectional side elevation.

A represents the door of chamber; B, shelves on inside of chamber; C, ventilator; E, pipe or funnel of stove, to which it is attached; F, collar or clamp for attaching it to pipe.

My cupboard is constructed of sheet-iron, tin, or any suitable metal, preferably of tin, it being lighter and cheaper. It may be constructed square, round, oblong, or any other shape desired, and of any suitable dimensions as to length and circumference, and it may entirely or only partially surround the pipe.

When made to entirely surround the pipe it is constructed in two or more sections clamped together by means of the collar F. The interior of the chamber is provided with shelves B for the accommodation of the food to be kept warm, or upon which the fruit to be dried is placed. Any required number of shelves may be used, and they may be placed at any suitable distances apart. They may be adjustable or stationary, perforated or impervious, as found most desirable and convenient.

Most warming-chambers as heretofore constructed are so arranged that the pipe is made to pass directly through the interior of the chamber without any protection from the vapors arising from the substances placed therein, whereby it is discolored and corroded. It is also usually necessary when attaching those of ordinary construction to disconnect the pipe.

These difficulties are obviated in my invention, the first by an impervious wall which intervenes between the interior of the chamber and the pipe; and, second, my cupboard is attached to the pipe by means of the collar or clamp F, which is provided with a screw-bolt and nut for the purpose of drawing it tightly around the pipe. A strip of sheet-iron is riveted to that part of the chamber in contact with the pipe, and allowed to project one or more inches at top and bottom, thereby forming a flange for the reception of the collar or clamp F. By means of this flange and collar the cupboard may be securely and readily attached to the pipe at any desired height, or it may be raised or lowered, or detached, at pleasure.

In order to allow the vapor necessarily created in warming food or drying fruit to escape, a ventilator, C, is provided at top, which may be opened or closed at pleasure. I do not, however, confine myself to this form of ventilator. The ventilator may be located in the sides or bottom, and any number may be employed as found desirable.

Having thus described my invention, I claim and desire to secure by Letters Patent—

A warming or drying cupboard, having the ventilator C, shelves B, and clamps or collars F, in combination with projecting flanges, whereby it may be closely and securely attached to the pipe of a stove, all arranged substantially as described, and for the purpose specified.

In testimony that I claim the foregoing as my own invention, I affix my signature in presence of two witnesses.

SIMEON P. WHITCOMB.

Witnesses:
H. G. DOUGLASS,
W. J. JOHNSTON.